(12) United States Patent
Czezatke et al.

(10) Patent No.: US 10,275,509 B2
(45) Date of Patent: Apr. 30, 2019

(54) REPLICA CHECKPOINTING WITHOUT QUIESCING

(71) Applicant: Maxta, Inc., Sunnyvale, CA (US)

(72) Inventors: Christian Czezatke, San Francisco, CA (US); Raghu Shastry, San Jose, CA (US)

(73) Assignee: Maxta, Inc., Santa Clara, CA (US)

( * ) Notice: Subject to any disclaimer, the term of this patent is extended or adjusted under 35 U.S.C. 154(b) by 565 days.

(21) Appl. No.: 14/920,570

(22) Filed: Oct. 22, 2015

(65) Prior Publication Data
US 2017/0116302 A1  Apr. 27, 2017

(51) Int. Cl.
*G06F 17/30* (2006.01)
*G06F 11/16* (2006.01)
*G06F 11/20* (2006.01)

(52) U.S. Cl.
CPC .... *G06F 17/30581* (2013.01); *G06F 11/1662* (2013.01); *G06F 11/2094* (2013.01); *G06F 2201/84* (2013.01)

(58) Field of Classification Search
CPC .......... G06F 17/30581; G06F 11/2094; G06F 11/1662; G06F 2201/84
See application file for complete search history.

(56) References Cited

U.S. PATENT DOCUMENTS

| | | | | |
|---|---|---|---|---|
| 6,934,755 B1 * | 8/2005 | Saulpaugh | ............ | G06F 9/4862 709/225 |
| 2007/0233981 A1 * | 10/2007 | Arakawa | ............ | G06F 11/2064 711/162 |
| 2008/0033925 A1 * | 2/2008 | Richards | ........... | G06F 17/30545 |
| 2014/0089264 A1 * | 3/2014 | Talagala | .............. | G06F 11/1471 707/649 |
| 2014/0089265 A1 * | 3/2014 | Talagala | ............ | G06F 17/30551 707/674 |
| 2015/0154081 A1 * | 6/2015 | Javadekar | ........... | G06F 11/1484 707/639 |

* cited by examiner

*Primary Examiner* — Albert M Phillips, III
(74) *Attorney, Agent, or Firm* — Fenwick & West LLP

(57) ABSTRACT

A master node receives an instruction to create a checkpoint. The master node then tags new storage operations received by the master node after receiving the instruction and sends a request to a plurality of replica nodes of the data storage system to create the checkpoint. New operations that arrive to the data storage system are tagged. The new operations are tagged until acknowledgement messages are received from every replica node in response to the request. The acknowledgement message indicates successful creation of a checkpoint by a replica that sent the acknowledgment message. The master node determines whether all tagged operations have been completed and sends a commit checkpoint request once all tagged storage operations have been completed. After receiving a validation message from a replica node in response to the commit checkpoint request, the master node validates the checkpoint created by the replica node that sent the validation message.

20 Claims, 3 Drawing Sheets

REPLICA CHECKPOINTING WITHOUT QUIESCING

BACKGROUND

Technical Field

The present invention relates to data storage and, more specifically, to providing checkpoints for data storage replicas.

Description of the Related Art

To increase reliability of a distributed data storage system, data is replicated to two or more nodes. In some occasions, nodes in the distributed system may go offline. For instance, a storage node may go offline due to a failure in a server hosting the node. During the time the node was offline, data in the data storage system may have changed. As a result, the data stored in the node that went offline may become stale.

After the node that went offline is restored, a resynchronization is performed using a checkpoint that represents a last known state of the storage node and incrementally rebuilding the node by applying the changes that occurred in the data storage system since the checkpoint was created. Such checkpoints are periodically created to reduce the amount of data to be resynchronized in the case of a failure of a node.

In a conventional storage system the data storage system is brought to a quiescent point prior to creating a checkpoint. As used herein, a quiescent point is state of a node where data is not changing. Before a quiescent point is achieved, all operations that are currently in flight (e.g., an operation that has arrived at the data storage system, but have not been applied to the node) are applied to the node. During a quiescent point, every active node in the data storage system contains the same data.

To achieve a quiescent point in a conventional storage system, updates to the data storage system that arrived after the initiation of the process to achieve a quiescent point are suspended. During this period of time, all the operations currently inflight for each of the nodes of the data storage system are flushed. As such, throughput is reduced during the checkpoint generation process.

SUMMARY

A computer-implemented method enables creating checkpoints without suspending updates to the data storage system while the checkpoint is being created.

In one embodiment, a master node receives an instruction to create a checkpoint. The master node then tags pending and new incoming storage operations received by the master node after receiving the instruction and sends a request to a plurality of replica nodes of the data storage system to create the checkpoint. New operations that arrive to the data storage system are tagged. The new operations are tagged until acknowledgement messages are received from every replica node in response to the checkpoint creation request. The acknowledgement message indicates successful creation of a checkpoint by a replica that sent the acknowledgment message. The master node stops tagging new incoming operations and waits for all tagged operations that are pending to complete. The master node sends a commit checkpoint request once all tagged storage operations have been completed. After receiving a confirmation message from a replica node in response to the commit checkpoint request, the master node validates the checkpoint created by the replica node that sent the validation message. If a replica does not respond or fails a commit checkpoint request, the checkpoint is not considered as valid on that particular replica.

In other embodiments, a non-transitory computer readable storage medium stores instructions that when executed by one or more processors carries out the methods described above. In yet further embodiments, a computing system is configured to perform one or more the methods described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION

Figure 1:
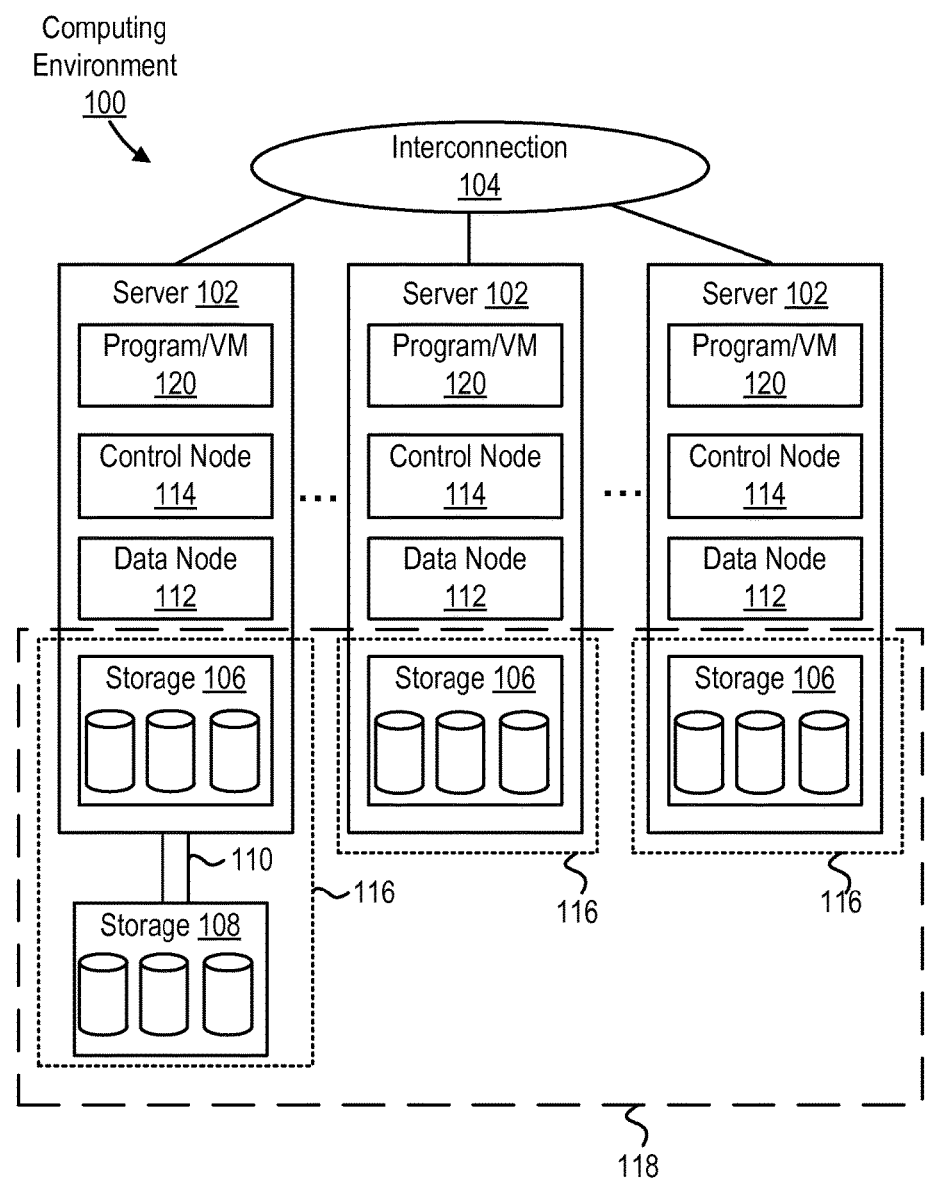
FIG. 1 is a simplified illustration of a computing environment in accordance with an embodiment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

The disclosed embodiments include a system, method, and non-transitory computer-readable storage medium for creating a checkpoint for resynchronization of a replica node in a data storage system. The computing environment includes a plurality of servers each having one or more locally accessible storage pools that contributes to the global storage pool available to the servers. The disclosed embodiments enable the creation of the checkpoint without suspending updates of the nodes of the data storage system while the checkpoint is being created.

A weak checkpoint is created by creating checkpoints without enforcing a quiescence point at which all pending operations are suspended. Instead, the storage system flags operations that arrived to the data storage system before every active node in the data storage system have replied to a master node regarding the creation of the checkpoint. The checkpoints for each node are validated after the node has finished applying all the flagged operations. In the case of a node failure, only validated checkpoints are used to resynchronize the failing nodes.

Reference is now made to FIG. 1, which is a simplified illustration of an embodiment of a computing environment 100. As seen in FIG. 1, the computing environment 100 comprises at least one server 102. The servers 102 may be interconnected via interconnection 104, such as a local area network (LAN) to enable communication among them. A server 102 may include one or more storage devices 106 located within the server 102 and/or one or more storage devices 108 located outside the server 102 and directly attached to the server 102 (i.e., without a network-based connection) via an interconnection 110, such as Serial-Attached Small Computer System Interface (SAS) or Serial Advanced Technology Attachment (SATA). The storage devices 106, 108 can be implemented by any type of storage technology or by a combination of storage technologies. For example, magnetic disk drive technology, solid state drive technology, or a storage system combining multiple storage devices using multiple storage technologies can be used for implementing the storage devices 106, 108. At least one server 102 comprises a $1^{st}$ instance of a computer program module, illustratively embodied as data node 112. At least one server 102 comprises a $2^{nd}$ instance of a computer program module, illustratively embodied as control node 114. Each server 102 in the computing environment may be running (a) a data node 112 only or (b) a control node 114 only or (c) both a data node 112 and a control node 114 or (d) neither a data node 112 nor a control node 114. A single computer program module can act as both a data node 112 and a control node 114 at the same time.

In an embodiment, control nodes 114 and data nodes 112 can be implemented as one or more processors (which may also be used by other components of the server 102) and a non-transitory computer-readable storage medium that stores instructions that when executed by the one or more processors carries out the functions attributed to the control nodes 114 and data nodes 112 respectively as described herein.

The data node 112 may manage some or all of the storage devices 106 within its hosting server 102 and some or all of the storage devices 108 attached to its hosting server 102. The aggregation of the managed storage devices is illustratively embodied as a local storage pool 116 which represents storage locally accessible to a given server 102. In some embodiments, a data node may have more than one local storage pools 116. The control node 114, in cooperation with the other control nodes 114, if more than one control node 114 exists in the computing environment 100, create and manage a single name space and a single global storage pool 118 that is composed of some or all of the local storage pools 116. When an operation requires an action from a control node 114, any control node 114 in any server 102 can be invoked to perform the operation since all control nodes 114 work in cooperation. The global storage pool 118 acts as a data repository for computer programs and virtual machines and stores, for example, file data used by the various computer programs and virtual machines. In addition to being a data repository, global storage pool 118 maintains metadata to manage the data repository and information and statistics about the usage of the various local storage pools 116 for various operations such as read or write operations.

When a file is stored in the global storage pool, one or more images of the file (or components thereof) are stored in one or more local storage pools. An image of a file can be stored either in a single local storage pool, across multiple local storage pools located in the same server, or across multiple local storage pools located across multiple servers.

Servers 102 also store various computer programs and or virtual machines (VM) embodied as a non-transitory computer-readable storage medium storing instructions executable by one or more processors. Each computer program or virtual machine (VM) 120 executing within every server 102 in the computing environment 100 can have access to the entire global storage pool 118 and can create and delete files from it and read and write to any of the files stored in it.

To increase the robustness of the data repository, the data stored in the repository is replicated. For instance, data may be replicated in multiple physical locations. For example, the data repository may include a first server 102 physically located in San Francisco, Calif., and a second server 102 physically located in Mayes County, Okla.

Figure 2:
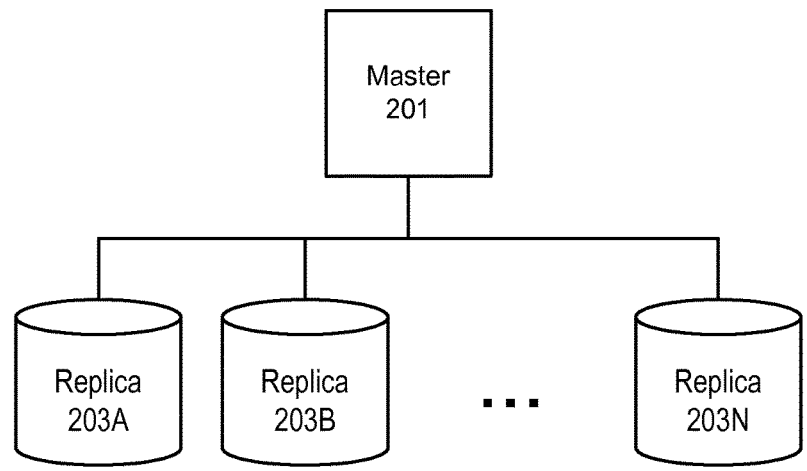
FIG. 2 is a simplified illustration of a block diagram of a logical configuration of data storage modules in a data storage system in accordance with an embodiment.

The data repository logically defines multiple storage modules or nodes to store the data and the replicas. FIG. 2 is a block diagram of a logical configuration of data storage modules in a data storage system. The data storage system includes one master 201 and multiple replicas 203. The master 201 is communicatively coupled to each replica 203. In some embodiments, the replicas 203 may also be communicatively coupled to each other. In some embodiments, a single storage module (i.e., the master 201 or a replica 203) may be distributed among multiple servers 102. Additionally, a single server may also host multiple storage modules (e.g., the master 201 and one replica 203, or multiple replicas 203).

The master 201 communicates with each of the replicas 203 to create checkpoints. The master 201 sends a message to each of the replicas 203 to create a checkpoint. Each replica 203 may in turn, respond to the message sent by the master 201 notifying the master of the completion of the creation of the checkpoint.

Figure 3:
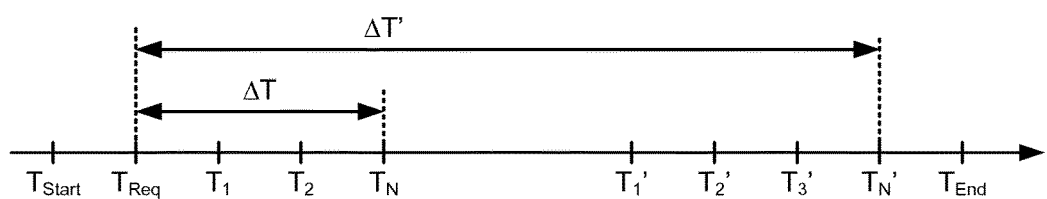
FIG. 3 is a simplified illustration of a timeline for creating a checkpoint for resynchronizing a data storage module in a data storage system in accordance with an embodiment.

FIG. 3 illustrates a timeline for creating a checkpoint for resynchronizing a replica, according to one embodiment. At time $T_{Start}$, the checkpoint creation process starts. For instance, the master 201 may receive a request for the creation of the checkpoint. At time $T_{req}$, the master 201 sends requests to each of the replicas to create their own checkpoints. Each replica starts generating their own checkpoints. Since each replica acts independently of the other replicas, each replica may finish creating their own checkpoint at different times. For instance, replica 203A may finish creating a checkpoint at time $T_1$, replica 203B may finish creating a checkpoint at time $T_2$, and replica 203N may finish creating a checkpoint at time $T_N$.

During this time ($T_{Start}$ through $T_N$), new operations may have been performed to the data repository (e.g., new data may have been stored in the data repository, data may have been modified in the data repository, or data may have been deleted in the data repository). Some of these new operations may have been applied to a first subset of replicas before the creation of the replica's checkpoint but not to a second subset of replicas. For instance, an operation may have been applied to replica 203N that finished creating a replica at time $T_N$ but not to replica 203A that finished creating a replica at time $T_1$. Furthermore, some operations that arrived before $T_{Start}$ may have not been applied to some of the replicas when the checkpoint creation process started. As such, the state of each replica may be different when each of the replicas created their own checkpoint.

To achieve synchronization between replicas, the checkpoints created by each of the replicas are not validated until the replicas have applied the operations that were inflight when the checkpoint creation process started (i.e., operations that arrived before $T_{req}$), and operations that arrived in the time window when the checkpoint were being created (i.e., $T_{req}$ through $T_N$). Referring back to FIG. 3, replica 203 that finished creating a checkpoint at time $T_1$, finishes applying all the operations that arrived before $T_N$ at time $T_1'$. Similarly, replica 203B finishes applying all the operations that arrived before $T_N$ at time $T_2'$. At time $T_N'$, the last replica finishes applying all the operations that arrived before $T_N$. When all the replicas finish applying all the operations, the checkpoints are validated and they can be used to restore a replica if the data stored in the replica becomes state.

Alternatively, each checkpoint for each replica may be validated as each replica finishes applying all the operations that arrived before $T_N$. As such, the check point for replica 1 is validated at time $T_1'$, the checkpoint for replica 2 is validated at time $T_2'$, and so forth. Thus, the checkpoint for replica 203A can be used to restore replica 203A after the checkpoint for replica 203A has been validated at time $T_1'$, the checkpoint for replica 203B can be used to restore replica 203B after the checkpoint for replica 203B has been validated at time $T_2'$, and the checkpoint for replica 203N can be used to restore replica 203N after checkpoint for replica 203N has been validated at time $T_N'$. After all the checkpoints have been validated, the process ends at $T_{End}$.

Figure 4:
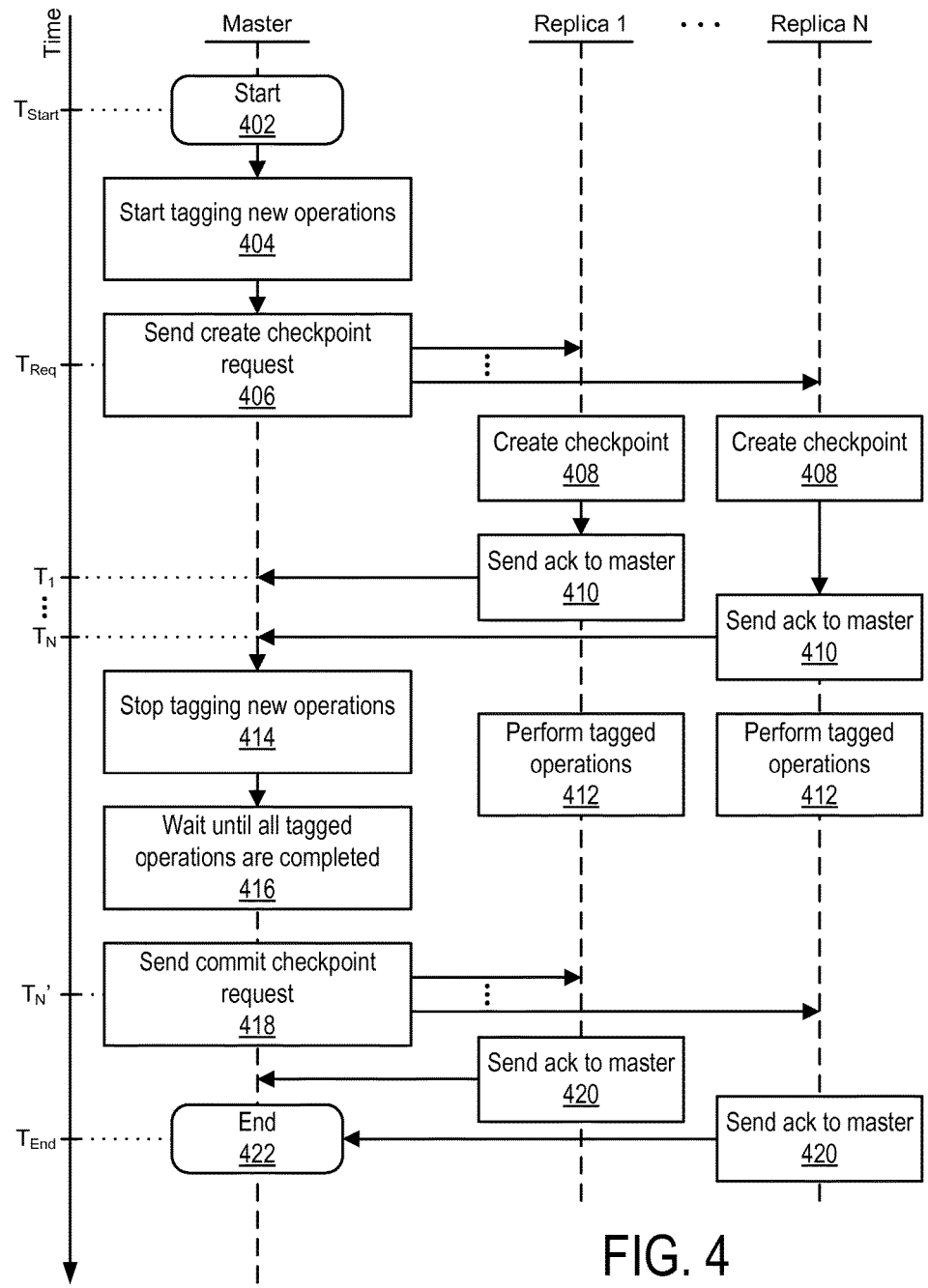
FIG. 4 is a simplified illustration of a flow diagram of an exemplary method for creating a checkpoint for resynchronizing a data storage module in a data storage system in accordance with an embodiment.

FIG. 4 illustrates a flow diagram for creating checkpoints, according to one embodiment. The flow diagram starts at step 402 corresponding to time $T_{Start}$. The master 201 starts tagging 404 new operations that arrive to the master node. At time $T_{req}$, the master 201 sends 406 a request to each replica to create a checkpoint. In some embodiments, before the request to create checkpoints is sent by the master 201 to each replica 203, all in-flight operations are also tagged.

In some embodiments, the master 201 tags the operations by appending or modifying data or metadata associated with the operation. For instance, operations may be tagged by asserting one bit in a header field of the operation.

In other embodiments, the master node maintains a data structure (e.g., a list or a tree) that contains a record of every in-flight operation managed by the master node. In addition to the tag, entries of the data structure may contain an identification of the in-flight operations, the type of operation (e.g., read, write), the start/end offset of the operation with respect to the target object the operation acts upon, and completion state of the operation. When a new operation is received by the master, the master adds an entry to the data structure for the newly received operation and sends a request with the newly received operation to the replicas. When the operation is completed, the entry is removed from the data structure.

Each replica 203 creates 408 a checkpoint and sends 410 an acknowledgment message to the master 201 signaling the creation of the checkpoint. For instance, replica 1 sends an acknowledgment message to master 201 at time $T_1$, and replica N sends an acknowledgment to master 201 at time $T_N$.

After acknowledgment messages have been received from every replica, the master stops tagging 414 new operations. In some embodiments, if acknowledgement messages have not been received from one or more replicas after a set amount of time, the master stops tagging 414 new operations and excludes the replicas from which acknowledgment messages have not been received from the checkpoint creation process. In some embodiments, if only one or less acknowledgment messages are received by the master 201, the checkpoint creation process may be abandoned or restarted.

The master 201 waits 416 until all tagged operations are completed and sends 418 a commit checkpoint request to replicas involved in the checkpoint creation process. In addition, each replica sends 420 a commit checkpoint acknowledgement message to master 201 after receiving the commit checkpoint request from the master 201. In one embodiment, the master 201 waits until all the replicas have finished performing the tagged operations before sending commit checkpoint messages to all of the replicas. As such the master 201 sends a commit checkpoint message to every replica at time $T_N'$. In another embodiment, after the master 201 determines that replica 1 has finished performing tagged operations, the master node 201 sends a commit checkpoint message to replica 1 at time $T_1'$, and after master 201 determines that replica N has finished performing tagged operations, master 201 sends a commit checkpoint message to replica N at time $T_N'$.

Replica 1 and Replica N send commit checkpoint acknowledgement messages to master 201 after receiving the commit checkpoint message from the master 201. At time $T_{end}$, master 201 receives the commit checkpoint acknowledgement message from replica N and the process ends 422. In some embodiments, the master sends commit checkpoint messages to each replica as the each of the replicas finish performing all the tagged operations.

In some embodiments, the tag is a numerical value (e.g., assigned from a counter that sequentially increments for each incoming storage operation or a numerical time stamp derived from a high resolution timer) instead of a Boolean value. In one embodiment, when a snapshot request is received, the master 201 determines the lowest ID ($ID_{low}$) corresponding to a pending operation. Then, instead of stopping the tagging of operations when all replicas have created the checkpoint, the master 201 determines the numerical value ($ID_{high}$) of the tag of the latest incoming new operation when the acknowledgment message is received from the every replica and waits until no operation with an ID between $ID_{low}$, and $ID_{high}$ are pending before sending the commit checkpoint request. In another embodiment, the master 201 does not rely on $ID_{low}$, and instead waits until all the operations whose tags have a numerical value lower than $ID_{high}$ have been performed and sends 418 a commit checkpoint request to replicas involved in the checkpoint creation process.

Replica Resynchronization

When a resynchronization is performed, the latest validated checkpoint in common between the one or more replicas to be resynchronized and an up-to-date replica is identified. The identified checkpoint is used as a basis for an incremental update of the one or more replicas to be resynchronized.

In some embodiments, if more than one replica is to be resynchronized, different checkpoints may be used by different replicas if they became unavailable at different points in time. In other embodiments, a single checkpoint that is in common between all the replicas to be resynchronized is used.

Checkpoint Deletion

If a checkpoint was validated by every replica, older checkpoints may be deleted in order to free up storage resources. That is, if all replicas are online and synchronized, only that latest checkpoint that is committed on all replicas is preserved. If at least one replica is offline, the latest common checkpoint is preserved until the offline replicas have been synchronized, in addition to the latest checkpoint in common to all online and up-to-date replicas.

Upon reading this disclosure, those of skill in the art will appreciate still additional alternative embodiments having the features described herein. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the scope of the invention defined in the appended claims.

What is claimed is:

1. A computer-implemented method for creating a checkpoint for resynchronizing a node of a distributed data storage system including a master node and a plurality of replica nodes, each of the replica nodes storing replicated data of the distributed data storage system, the method comprising:
    receiving at a server hosting the master node, an instruction to create a checkpoint;
    responsive to the instruction, tagging, by the master node, new storage operations received by the master node after receiving the instruction;
    sending a request to the plurality of replica nodes of the distributed data storage system to create the checkpoint;
    responsive to receiving acknowledgement messages from every replica node of the plurality of replica nodes in response to the request, discontinuing tagging of new storage operations received by the master node after receiving an acknowledgment message from a last replica node, wherein the acknowledgment messages indicate successful creation of a checkpoint by a replica node that sent the acknowledgment message;
    determining when all tagged operations have been completed by each of the plurality of replica nodes;
    responsive to determining that all tagged storage operations have been completed by every replica node of the plurality of replica nodes, sending a commit checkpoint request to each of the plurality of replica nodes; and
    responsive to receiving a validation message from a replica node of the plurality of replica nodes in response to the commit checkpoint request, validating the checkpoint created by the replica node that sent the validation message.

2. The computer-implemented method of claim 1, further comprising:
    responsive to not receiving acknowledgement messages from every replica node of the plurality of replica nodes after a preset time, discontinuing tagging of the new storage operations received by the master node after the preset time.

3. The computer-implemented method of claim 2, further comprising:
    determining when all tagged operations have been completed by replica nodes from which an acknowledgement message was received;
    responsive to determining that all tagged storage operations have been completed by replica nodes from which an acknowledgement message was received, sending a commit checkpoint request to each of the plurality of replica nodes from which an acknowledgement message was received; and
    responsive to receiving a validation message from a replica node in response to the commit checkpoint request, validating the checkpoint created by the replica node that sent the validation message.

4. The computer-implemented method of claim 1, further comprising:
    responsive to the instruction, tagging storage operations that are pending when the instruction is received prior to sending the request to the plurality of replica nodes to create the checkpoint.

5. The computer-implemented method of claim 1, further comprising:
    responsive to validating the checkpoints of every replica node of the plurality of replica nodes of the distributed data storage system, deleting older checkpoints.

6. The computer-implemented method of claim 1, further comprising:
    responsive to receiving acknowledgment messages from only one or zero replica nodes after a preset time, abandoning creation of the checkpoint.

7. A non-transitory computer readable storage medium storing instructions for creating a checkpoint for resynchronizing a node of a distributed data storage system including a master node and a plurality of replica nodes, each of the replica nodes storing data replicating data of the master node, the instruction, when executed by a processor, cause the processor to:
    receive at a server hosting the master node, an instruction to create a checkpoint;
    responsive to the instruction, tag, by the master node, new storage operations received by the master node after receiving the instruction;
    send a request to the plurality of replica nodes of the distributed data storage system to create the checkpoint;
    responsive to receiving acknowledgement messages from every replica node of the plurality of replica nodes in response to the request discontinue tagging of new storage operations received by the master node after receiving an acknowledgment message from a last replica node, wherein the acknowledgment messages indicate successful creation of a checkpoint by a replica node that sent the acknowledgment message
    determine whether all tagged operations have been completed by each of the plurality of replica nodes;
    responsive to determining that all tagged storage operations have been completed by every replica node of the plurality of replica nodes, send a commit checkpoint request to each of the plurality of replica nodes; and
    responsive to receiving a validation message from a replica node of the plurality of replica nodes in response to the commit checkpoint request, validate the checkpoint created by the replica node that sent the validation message.

8. The non-transitory computer readable storage medium of claim 7, wherein the instruction further cause the processor to:
    responsive to not receiving acknowledgement messages from every replica node of the plurality of replica nodes after a preset time, discontinue tagging of the further new storage operations received by the master node after the preset time.

9. The non-transitory computer readable storage medium of claim 8, wherein the instruction further cause the processor to:
    determine when all tagged operations have been completed by replica nodes from which an acknowledgement message was received;
    responsive to determining that all tagged storage operations have been completed by replica nodes from which an acknowledgement message was received, send a commit checkpoint request to each of the plurality of replica nodes from which an acknowledgement message was received; and responsive to receiving a validation message from a replica node in response to the commit checkpoint request, validate the checkpoint created by the replica node that sent the validation message.

10. The non-transitory computer readable storage medium of claim 7, wherein the instruction further cause the processor to:

responsive to the instruction, tag storage operations that are pending when the instruction is received prior to sending the request to the plurality of replica nodes to create the checkpoint.

11. The non-transitory computer readable storage medium of claim 7, wherein the instruction further cause the processor to:

responsive to validating the checkpoints of every replica node of the plurality of replica nodes of the distributed data storage system, delete older checkpoints.

12. The non-transitory computer readable storage medium of claim 7, wherein the instruction further cause the processor to:

responsive to receiving acknowledgment messages from only one or zero replica nodes after a preset time, abandon creation of the checkpoint.

13. A distributed data storage system comprising:

a first set of one or more host servers having non-transitory computer readable storage medium, the one or more hosting servers hosting a master node configured to:

receive an instruction to create a checkpoint;

responsive to the instruction, tag new storage operations received by the master node after receiving the instruction;

send a request to a plurality of replica nodes of the distributed data storage system to create the checkpoint, responsive to receiving acknowledgement messages from every replica node of the plurality of replica nodes in response to the request, discontinue tagging of new storage operations received by the master node after receiving acknowledgment message from a last replica node, wherein the acknowledgment messages indicate successful creation of a checkpoint by a replica node that sent the acknowledgment message;

determine when all tagged operations have been completed by each of the plurality of replica nodes;

responsive to determining that all tagged storage operations have been completed by every replica node of the plurality of replica nodes, send a commit checkpoint request to each of the plurality of replica nodes; and responsive to receiving a validation message from a replica node of the plurality of replica nodes in response to the commit checkpoint request, validate the checkpoint created by the replica node that sent the validation message; and a second set of one or more servers having non-transitory computer readable storage medium, the one or more servers hosting the plurality of replica nodes, each replica node of the plurality of replica nodes configured to:

receive the request from the master node to create the checkpoint, responsive to receiving the request to create the checkpoint:

create the checkpoint, and send the acknowledgment message to the master node, apply the tagged operations, and responsive to applying every tagged operation, sending the validation message to the master node.

14. The system of claim 13, wherein the master node is further configured to:

responsive to not receiving acknowledgement messages from every replica node of the plurality of replica nodes after a preset time, discontinue tagging of the new operations received by the master node after the preset time.

15. The system of claim 14, wherein the master node is further configured to:

determine when all tagged operations have been completed by replica nodes from which an acknowledgement message was received;

responsive to determining that all tagged storage operations have been completed by replica nodes from which an acknowledgement message was received, send a commit checkpoint request to each of the plurality of replica nodes from which an acknowledgement message was received; and responsive to receiving a validation message from a replica node in response to the commit checkpoint request, validate the checkpoint created by the replica node that sent the validation message.

16. The system of claim 13, wherein the master node is further configured to:

responsive to the instruction, tag storage operations that are pending when the instruction is received prior to sending the request to the plurality of replica nodes to create the checkpoint.

17. The system of claim 13, wherein the master node is further configured to:

responsive to validating the checkpoints of every replica node of the plurality of replica nodes of the distributed data storage system, deleting older checkpoints.

18. The system of claim 13, wherein the master node is further configured to:

responsive to receiving acknowledgment messages from only one or zero replica nodes after a preset time, abandoning creation of the checkpoint.

19. A computer-implemented method for creating a checkpoint for resynchronizing a node of a distributed data storage system including a master node and a plurality of replica nodes, each of the replica nodes storing replicated data of the distributed data storage system, the method comprising:

receiving at a server hosting the master node, an instruction to create a checkpoint;

determining a first identification value for a first operation, the first operation pending when the instruction is received;

sending a request to the plurality of replica nodes of the distributed data storage system to create the checkpoint;

responsive to receiving acknowledgement messages from every replica node of the plurality of replica nodes in response to the request, determining a second identification value for a second operation, the second operation pending when acknowledgement messages from every replica node have been received;

determining when all operations with identification values between the first identification value and the second identification value have been completed by each of the plurality of replica nodes;

responsive to determining that all operations with identification values between the first identification value and the second identification value have been completed by every replica node of the plurality of replica nodes, sending a commit checkpoint request to each of the plurality of replica nodes; and responsive to receiving a validation message from a replica node of the plurality of replica nodes in response to the commit checkpoint request, validating the checkpoint created by the replica node that sent the validation message.

20. The method of claim 19, wherein:

the first operation is an operation with a lowest identification value that is pending when the instruction is received; and the second operation is an operation with a highest identification value that is pending when acknowledgement messages from every replica node have been received.

\* \* \* \* \*